United States Patent Office 3,361,542
Patented Jan. 2, 1968

3,361,542
PROCESS FOR THE PRODUCTION OF METAL BOROHYDRIDES
William H. Crawford, Gladwin, Mich., assignor to The Dow Chemical Company, Midland, Mich., a corporation of Delaware
No Drawing. Filed Nov. 6, 1963, Ser. No. 323,541
2 Claims. (Cl. 23—364)

ABSTRACT OF THE DISCLOSURE

A novel process for preparing lithium borohydride by reacting lithium chloride with sodium borohydride in the presence of a small amount of an ether soluble aluminum hydride ($AlH_3$) catalyst in a carrier liquid which is a solvent for both the reactants and the lithium borohydride.

---

This invention relates to the preparation of complex light metal hydrides and more particularly is concerned with a novel process for preparing lithium borohydride in high yields at relatively short reaction times.

The preparation of lithium borohydride ($LiBH_4$) by reacting lithium chloride with sodium borohydride in ether solvent is known in the art. However, this reaction is very slow, conversions are poor, and, for the reaction to proceed the reactants must be in a dry, finely divided state. Further, in the conventional processes during the lengthy times required for carrying out the reaction, the lithium borohydride ($LiBH_4$) product slowly precipitates as an amorphous solid from the reaction mass and cannot readily be recovered from the filter cake.

It is a principal object of the present invention to provide an improved process for the preparation of complex light metal hydrides and particularly lithium borohydride.

It is another object of the present invention to provide a process for the preparation of high purity lithium borohydride wherein the product readily is recovered from the reaction mass in high yields.

It is also an object of the present invention to provide a process for preparing lithium borohydride which does not require any special pre-preparation or treatment of reactants, such as comminuting to an extremely finely divided state or drying to substantially anhydrous conditions.

These and other objects and advantages readily will become apparent from the detailed description presented hereinafter.

The present process generally comprises reacting, in the presence of a small amount of a catalyst consisting of an ether soluble aluminum hydride, i.e., $AlH_3$, lithium chloride with a complex metal hydride of the general formula $M'M''H_4$ (wherein $M'$ is an alkali metal other than Li and $M''$ is an earth metal selected from the group consisting of boron and aluminum), in a solvent for both the reactants and the complex $LiM''H_4$ product. The $LiM''H_4$ product as produced is dissolved in the solvent. The product solution readily is separated from the coproduced solid $M'Cl$. The $LiM''H_4$ product is recovered from the solution by evaporation of the solvent or other recovery techniques. If desired, any residual reactant mass can be recontacted with the ether solvent for one or more additional reaction cycles. This readily gives conversions of from 80% up to theoretical of the reactants into the desired product.

Ordinarily about stoichiometric molar amounts of LiCl and the complex hydride, based on the relationship $LiCl + M'M''H_4 \rightarrow M'Cl + LiM''H_4$ are employed, although either of the reactants can be used in excess.

Aliphatic ethers and cyclic aliphatic ethers having a total carbon content of from 2 to about 6 usually are employed as solvent. Diethyl ether, methyl ethyl ether, isopropyl ether and tetrahydrofuran are especially suitable. Diethyl ether, because of its low boiling point and ready availability is particularly useful.

The amount of solvent employed at a minimum is such to provide a solution wherein the reactants have a maximum concentration of about 1 mole per liter of ether. Ordinarily the concentration of each of the reactants in the solvent ranges from about 0.1 to about 0.3 mole per liter although this is not critical.

The amount of catalyst to be employed ranges from about 2 to about 5 weight per cent, based on the total weight of the reactant materials, not including solvent. With smaller amounts of catalyst, the reaction proceeds at a slow rate similar to that of the prior art. Amounts of catalyst in excess of about 5 weight percent do not appear to further benefit the reaction rate. The catalyst can be added as a dry solid to the ethereal reaction solution, or can itself be added as an ether solution.

The process conveniently is carried out at about room temperature, i.e. 18 to about 30° C., and atmospheric pressure for a period of from several hours to about 24 hours or more. Ordinarily, the reaction time employed is from about 12 to about 24 hours. Longer reaction times do not promote further recoverable product yield and may give formation of some undesirable insoluble amorphous lithium borohydride which subsequently is lost in the filter cake.

After separation of the insoluble M.Cl salt from the product solution, the lithium complex metal hydride readily is recovered by evaporation of the ether solvent. This is usually carried out at low pressures at a maximum temperature of about 30° C. Evaporation of the solvent at higher temperatures provides an amorphous product which is insoluble in diethyl ether and therefore is undesirable for many utilities.

The process can be carried out in batch type, cyclic, continuous or other types of operations as are understood by one skilled in the art.

The following examples will serve to further illustrate the present invention but are not meant to limit it thereto.

Example 1

About 4 liters of substantially anhydrous diethyl ether was placed in a 5-liter, 3-necked flask, equipped with an agitator. The system was flushed with nitrogen. About 50 grams (~1.32 gram-mole) of sodium borohydride and about 50 grams (~1.18 gram-mole) of substantially dry lithium chloride were added to the ether while the ether was being stirred. This provides a concentration of each reactant of about 0.3 gram-mole per liter of ether solvent.

A solution of aluminum hydride in diethyl ether (about 1 molar in aluminum hydride) was added to the reaction flask in an amount of about 3 weight percent based on the total weight of lithium chloride and sodium borohydride reactants. The aluminum hydride catalyst was prepared by reacting stoichiometric amounts of lithium aluminum hydride and aluminum chloride in diethyl ether.

The reaction mixture was stirred for a period of about 18 hours at atmospheric pressure and about room temperature. After this period, the reaction flask contained product solution and residual solids consisting primarily of sodium chloride and unreacted sodium borohydride-lithium chloride. The agitation was stopped and the product solution transferred by pressurized inert nitrogen into an evaporation flask through a dip pipe and medium porosity sintered glass filter. The evaporation flask in turn was submerged in a water bath maintained at about 30° C. and attached to a low pressure pump.

The ethereal product solution was subjected to a pressure of about 5 millimeters mercury absolute which vaporized the ether solvent, the solvent vapors being condensed into a flask which was cooled by a Dry Ice methylene chloride bath.

Following removal of substantially all of the ether, the pressure was increased to atmospheric by introducing substantially anhydrous nitrogen into the reaction flask. A sample of the product was analyzed and found to be substantially 100 percent pure lithium borohydride as determined by X-ray diffraction.

The ether solvent was recharged to the reaction flask containing the unreacted starting materials and sodium chloride by-product and the process cycle repeated. Analysis of the resulting product from this cycle as recovered from the ethereal product solution also indicated lithium borohydride of substantially 100 percent purity. The overall product yield and recovery from the two cycles was about 80 percent.

By additional cycles the product yield can be increased to substantially 100 percent of theoretical.

*Example 2*

A run was made using the same equipment procedures, solvent and reactant concentrations as described for Example 1 except that about 5 weight percent of the aluminum hydride catalyst was used and the reaction period was about 24 hours.

After about 24 hours, the ether solution of product was removed from the residual solid mass and the lithium borohydride recovered therefrom as described for Example 1. About 40 percent yield of substantially pure $LiBH_4$ was recovered.

The ether was collected and again added to the reaction flask containing the residual solids. After a second 24 hour period, the resulting ether product solution was separated from the reaction mass and the lithium borohydride product recovered from the solution. This second cycle also produced product of substantially 100 percent pure $LiBH_4$ again in about 40% yield.

As a control, these two 24 hour cycles of operation were repeated on a separate substantially identical reaction mass from which the catalyst had been excluded. No lithium borohydride product was recovered from the ether even after 48 hours reaction. After this period, about 1 percent, on the weight of reactants, of an ether soluble aluminum hydride was added to the diethyl ether solvent and this solution reacted with the previously contacted reactants for a period of about 24 hours at room temperature. After this period, substantially pure $LiBH_4$ in about 25% yield was recovered from the ether solvent after separation from the residual solids of the reaction mass.

Instead of cyclic bath type operation as shown for these examples, substantially theoretical yields of the product can be achieved in an operation wherein the sodium chloride by-product or lithium borohydride ether solution is continually removed from the reaction mass. The lithium borohydride then can readily be recovered in high purity and high yield from the substantially solids free solution. In this latter embodiment, the rate and extent of reaction can be followed from a determination of the amount and rate of precipitation of the sodium chloride by-product from the reactor, for example.

In a manner similar to that described for the foregoing examples, the present improved process can be used to prepare lithium aluminum hydride by reaction of sodium aluminum hydride or potassium aluminum hydride with lithium chloride. Similarly, potassium borohydride and lithium chloride can be reacted in accordance with the present novel process to prepare lithium borohydride.

Various modifications can be made in the present invention without departing from the spirit or scope thereof for it is understood that I limit myself only as defined in the appended claims.

I claim:
1. In a process for preparing lithium borohydride by reacting lithium chloride and sodium borohydride the improvement which comprises;
   (a) intermixing lithium chloride with sodium borohydride in diethyl ether solvent in the presence of a diethyl ether soluble aluminum hydride ($AlH_3$) catalyst, the concentration of each of the reactants in said solvent ranging from about 0.1 to about 0.3 gram-mole per liter and the amount of said aluminum hydride catalyst ranging from about 2 to about 5 weight percent based on the total weight of said reactants,
   (b) reacting the admixture at about room temperature for a period of from about 12 to about 24 hours,
   (c) separating the resulting product solution from the solid sodium chloride by-product, and
   (d) removing the diethyl ether solvent from the product at a maximum temperature of about 30° C.

2. In a process for preparing lithium borohydride by reacting lithium chloride and sodium borohydride the improvement which comprises;
   (a) intermixing lithium chloride with sodium borohydride in diethyl ether solvent in the presence of a diethyl ether soluble aluminum hydride ($AlH_3$) catalyst, the concentration of each of said lithium chloride and sodium borohydride reactants in said solvent being about 0.3 gram-mole per liter and the amount of said aluminum hydride catalyst being about 3 weight percent on the total weight of said reactants,
   (b) reacting the admixture at about room temperature for about 18 hours,
   (c) separating the resulting lithium borohydride product solution from the residual solid sodium chloride by-product and unreacted lithium chloride and sodium borohydride reactants,
   (d) removing the diethyl ether solvent from the product at a maximum temperature of about 30° C., thereby to provide substantially pure solid lithium borohydride,
   (e) recovering the diethyl ether solvent and contacting said residual unreacted lithium chloride and sodium borohydride therewith for a period of about 18 hours at about room temperature,
   (f) separating the resulting lithium borohydride ether solution from residual solids, and
   (g) removing said ether at a maximum temperature of about 30° C. thereby to provide substantially pure solid lithium borohydride.

References Cited

UNITED STATES PATENTS

| 2,726,926 | 12/1955 | Paul et al. | 23—362 |
| 3,162,508 | 12/1964 | Bragdon et al. | 23—365 |
| 3,222,120 | 12/1965 | Del Guidice | 23—364 X |

OTHER REFERENCES

Gaylord: "Reduction With Complex Metal Hydrides," 1956, pp. 42, 43.

MILTON WEISSMAN, *Primary Examiner.*